(12) United States Patent
Balsiger et al.

(10) Patent No.: US 9,800,119 B2
(45) Date of Patent: Oct. 24, 2017

(54) ELECTROMECHANICAL ACTUATOR HAVING AN OIL AND WATER THERMAL SYSTEM

(71) Applicant: Hamilton Sundstrand Corporation, Windsor Locks, CT (US)

(72) Inventors: Derick S. Balsiger, Mayer, AZ (US); Ravi Adimula, Chandler, AZ (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 247 days.

(21) Appl. No.: 14/556,641

(22) Filed: Dec. 1, 2014

(65) Prior Publication Data

US 2016/0156252 A1    Jun. 2, 2016

(51) Int. Cl.
| | |
|---|---|
| H02K 5/18 | (2006.01) |
| H02K 9/20 | (2006.01) |
| B64C 13/28 | (2006.01) |
| H02K 5/20 | (2006.01) |
| H02K 9/19 | (2006.01) |
| H02K 15/14 | (2006.01) |
| H02K 7/14 | (2006.01) |

(Continued)

(52) U.S. Cl.
CPC .............. *H02K 9/20* (2013.01); *B64C 13/28* (2013.01); *H02K 5/18* (2013.01); *H02K 5/20* (2013.01); *H02K 7/14* (2013.01); *H02K 9/19* (2013.01); *H02K 9/22* (2013.01); *H02K 15/14* (2013.01); *B64C 2013/506* (2013.01); *Y02T 50/44* (2013.01)

(58) Field of Classification Search
CPC .. H02K 5/18; H02K 9/19; H02K 9/22; H02K 11/33; H02K 15/14; H02K 16/04; H02K 19/103; H02K 1/14; H02K 1/17; H02K 53/00; H02K 5/20; H02K 7/116; H02K 7/14; H02K 7/1823; H02K 9/20
USPC .................. 310/54, 52, 60 A, 57, 55, 60, 61
See application file for complete search history.

(56) References Cited

U.S. PATENT DOCUMENTS

| | | | | |
|---|---|---|---|---|
| 3,842,596 | A | * 10/1974 | Gray | F01D 5/088 165/104.25 |
| 4,137,472 | A | * 1/1979 | Workman | H02K 9/20 165/104.25 |

(Continued)

FOREIGN PATENT DOCUMENTS

| | | | | |
|---|---|---|---|---|
| DE | 102009012324 A1 | * | 9/2010 | ............... H02K 1/32 |
| DE | 102010001488 A1 | * | 8/2011 | ............... H02K 9/20 |
| WO | 03023942 A1 | | 3/2003 | |

OTHER PUBLICATIONS

Thermal Conductivity table for some common materials from http://www.farm.net/~mason/materials/thermal_conductivity.html.*

(Continued)

*Primary Examiner* — Terrance Kenerly
(74) *Attorney, Agent, or Firm* — Cantor Colburn LLP

(57) ABSTRACT

A cooling system of an electromechanical actuator is provided. The cooling system includes a housing and a stator located within the housing and defining a central bore. A first body including a sleeve portion is configured to extend into the central bore of the stator, with the first body defining a first chamber including a first cavity within the sleeve portion and a second cavity fluidly connected to the first cavity. A heat sink is provided in thermal communication with the second cavity.

7 Claims, 3 Drawing Sheets

(51) Int. Cl.
*H02K 9/22* (2006.01)
*B64C 13/50* (2006.01)

(56) References Cited

U.S. PATENT DOCUMENTS

| | | | | |
|---|---|---|---|---|
| 4,574,210 A * | 3/1986 | Wieland | ............ | H02K 9/20 310/59 |
| 5,283,488 A * | 2/1994 | Ponnappan | ............ | H02K 9/20 310/54 |
| 5,629,573 A * | 5/1997 | Ponnappan | ............ | H02K 9/20 310/54 |
| 5,869,912 A * | 2/1999 | Andrew | ............ | H02K 1/20 310/52 |
| 5,883,449 A * | 3/1999 | Mehta | ............ | F04D 25/082 310/417 |
| 6,294,853 B1 * | 9/2001 | Lin | ............ | H02K 9/20 310/52 |
| 7,834,494 B2 * | 11/2010 | Blanding | ............ | B64C 13/00 310/112 |
| 2005/0206258 A1 * | 9/2005 | Gustafson | ............ | H02K 9/197 310/87 |
| 2012/0205996 A1 * | 8/2012 | Buttner | ............ | H02K 9/20 310/54 |

OTHER PUBLICATIONS

Machine translation of DE 102010001488, Ursin, Aug. 2011.*
Machine translation of DE 102009012324, Schroeter, Sep. 2010.*
International Search Report, International Application No./Patent No. 15197226.2-1809, Date of Mailing May 6, 2016, European Patent Office; International Search Report 6 pages.

* cited by examiner

ELECTROMECHANICAL ACTUATOR HAVING AN OIL AND WATER THERMAL SYSTEM

BACKGROUND OF THE INVENTION

The embodiments herein generally relate to electromechanical actuators and more particularly to thermal cooling systems for electromechanical actuators.

The demands to actuate the ailerons and flaps of an aircraft during the extreme conditions of take-off, flight, and landing require powerful actuators. Traditional actuators were hydraulic actuators. Hydraulic actuators are relatively large in terms of volume and weight. The high surface area and mass provided by the structure combined with the cooling effects of the hydraulic fluid flow of the relatively large hydraulic actuators allowed for sufficient heat absorption and dissipation to prevent overheating of the hydraulic actuators during operation.

However, the trend in modern aircraft is toward a thin-wing design which limits the amount of space and weight of actuators that can be installed in and on wings of the aircraft. Due to the limited volume permitted with the wings of thin-wing aircraft, actuators must have reduced sizes as compared to the former hydraulic versions, both to fit within the wings and to reduce weight. Accordingly, electromechanical actuators have been proposed as a means of providing actuation for thin-wing aircraft in a more compact configuration.

The electromechanical actuators of thin-wing aircraft are smaller but the small size results in a higher power density. The increased power density increasing the production of heat which must be removed from the stator of the electromechanical actuator to prevent overheating and reduced motor performance.

BRIEF DESCRIPTION OF THE INVENTION

According to one embodiment, a cooling system of an electromechanical actuator is provided. The cooling system includes a housing and a stator located within the housing and defining a central bore. A first body including a sleeve portion is configured to extend into the central bore of the stator, with the first body defining a first chamber including a first cavity within the sleeve portion and a second cavity fluidly connected to the first cavity. Further, a heat sink is provided in thermal communication with the second cavity.

According to another embodiment, a method of manufacturing a cooling system of an electromechanical actuator is provided. The method includes providing a housing of an actuator and installing a stator defining a central bore within the housing. Further, the method includes installing a first body including a sleeve portion into the housing, wherein the sleeve portion of the body extends into the central bore of the stator and wherein the first body defines a first chamber including a first cavity within the sleeve portion and a second cavity fluidly connected to the first cavity. The method further includes providing a heat sink in thermal communication with the second cavity.

Technical effects of embodiments of the invention include providing an improved electromechanical actuator that is small in volume and provides an efficient thermal cooling system to remove heat from a stator of the actuator thus enabling high power density actuators for use in thin-wing aircraft.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
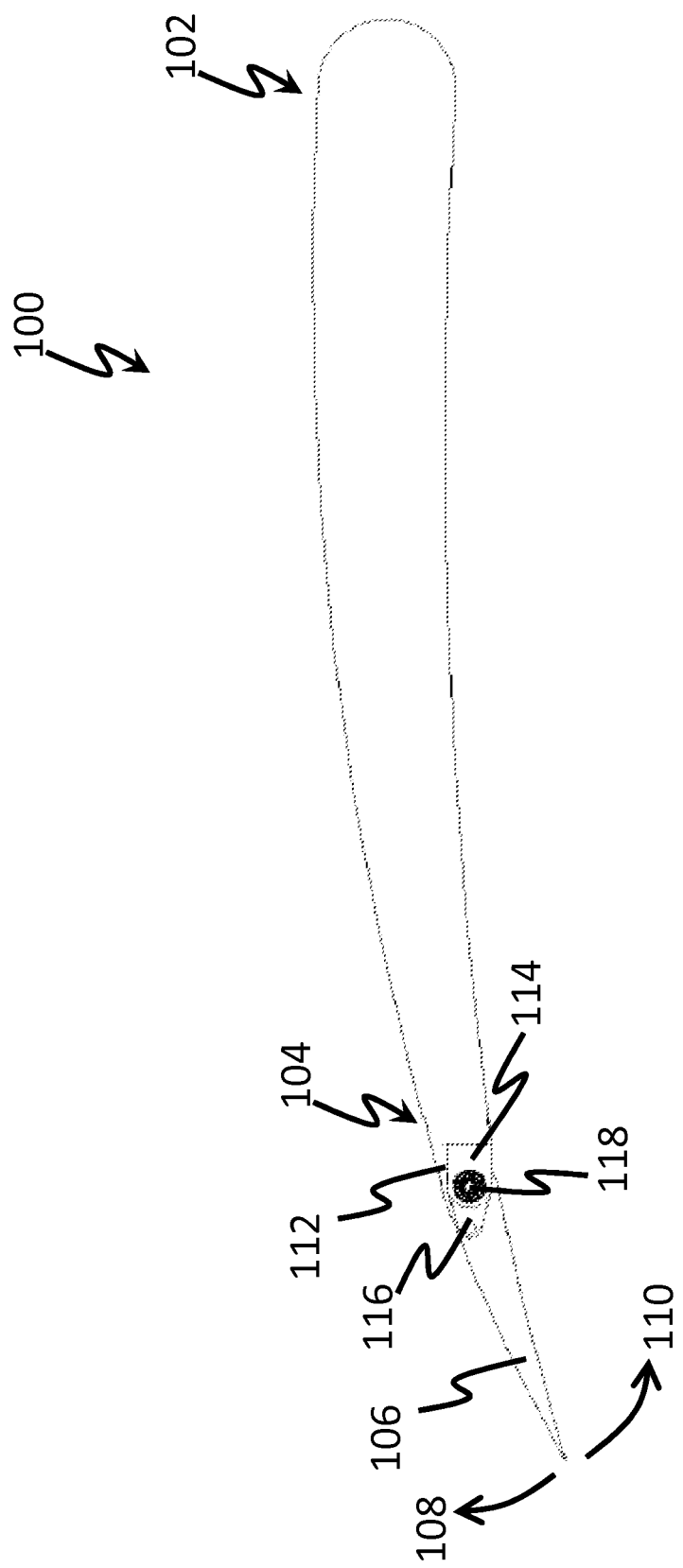
FIG. 1 is a cross-sectional exemplary illustration of a thin wing of an aircraft housing an actuator in accordance with embodiments of the invention.

Referring to FIG. 1, a cross-sectional exemplary illustration of a thin wing 100 of an aircraft housing an actuator 112 in accordance with embodiments of the invention is shown. Wing 100 defines a leading edge 102, which is to the right in FIG. 1, and a trailing edge 104, which is to the left in FIG. 1. Located at the trailing edge of the wing 100 is an aileron 106. Aileron 106 is rotationally or hingedly attached to the trailing edge 104 of wing 100. Aileron 106 provides a flight control surface that can be controlled to assist in the flight of an aircraft. Ailerons are used in pairs to control the aircraft in roll (or movement around the aircraft's longitudinal axis), which normally results in a change in flight path due to the actuation of the aileron 106.

The aileron 106 is configured to be actuated or rotated upward in direction 108 and downward in direction 110, as shown in FIG. 1. The actuation of aileron 106 is provided and controlled by the actuator 112, which operationally connects the aileron 106 to the trailing edge 104 of wing 100. Actuator 112 provides a hinged attachment between the aileron 106 and the wing 100. Actuator 112 connects to the wing 100 by means of a housing arm 114 which connects to a wing spar of wing 100, and connects to the aileron 106 by means of an output arm 116 that connects to an aileron spar of aileron 106. Actuator 112 is configured to allow aileron 106 to rotate about an axis of rotation 118.

The actuator 112 is an electromechanical actuator with an external rotor and an internal stator. Because the stator is configured internally (see FIGS. 2A and 2B) heat cannot be easily dissipated, such as by passing a cool fluid (e.g., ambient air) over the actuator 112. As the heat rises in the actuator 112, the performance of the stator of the actuator 112 decreases. Accordingly, an efficient means of thermal energy dissipation must be provided to remove the heat from the internally located stator.

Figure 2A:
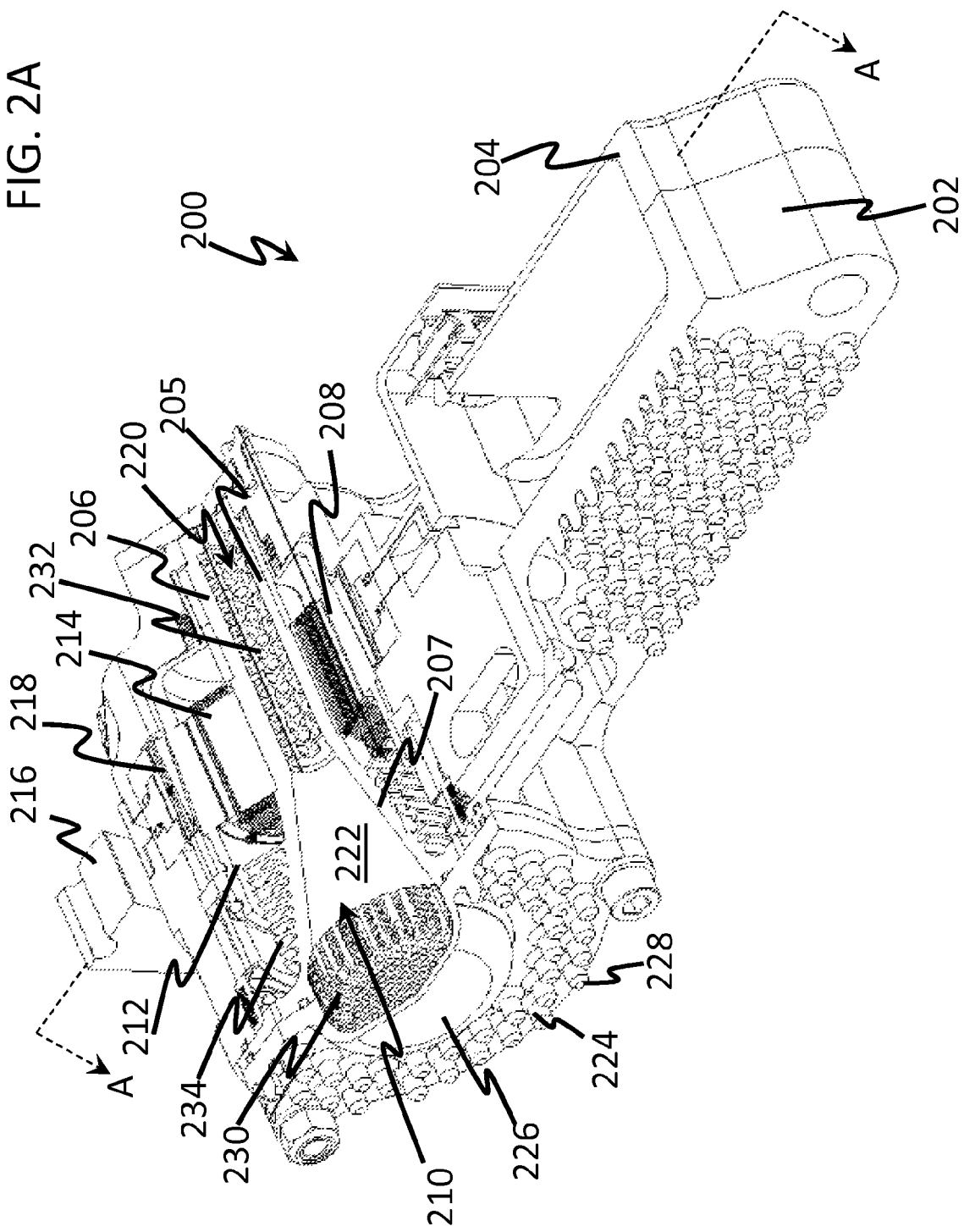
FIG. 2A is a schematic cut-away isometric view of an actuator in accordance with an exemplary embodiment of the invention.
Figure 2B:
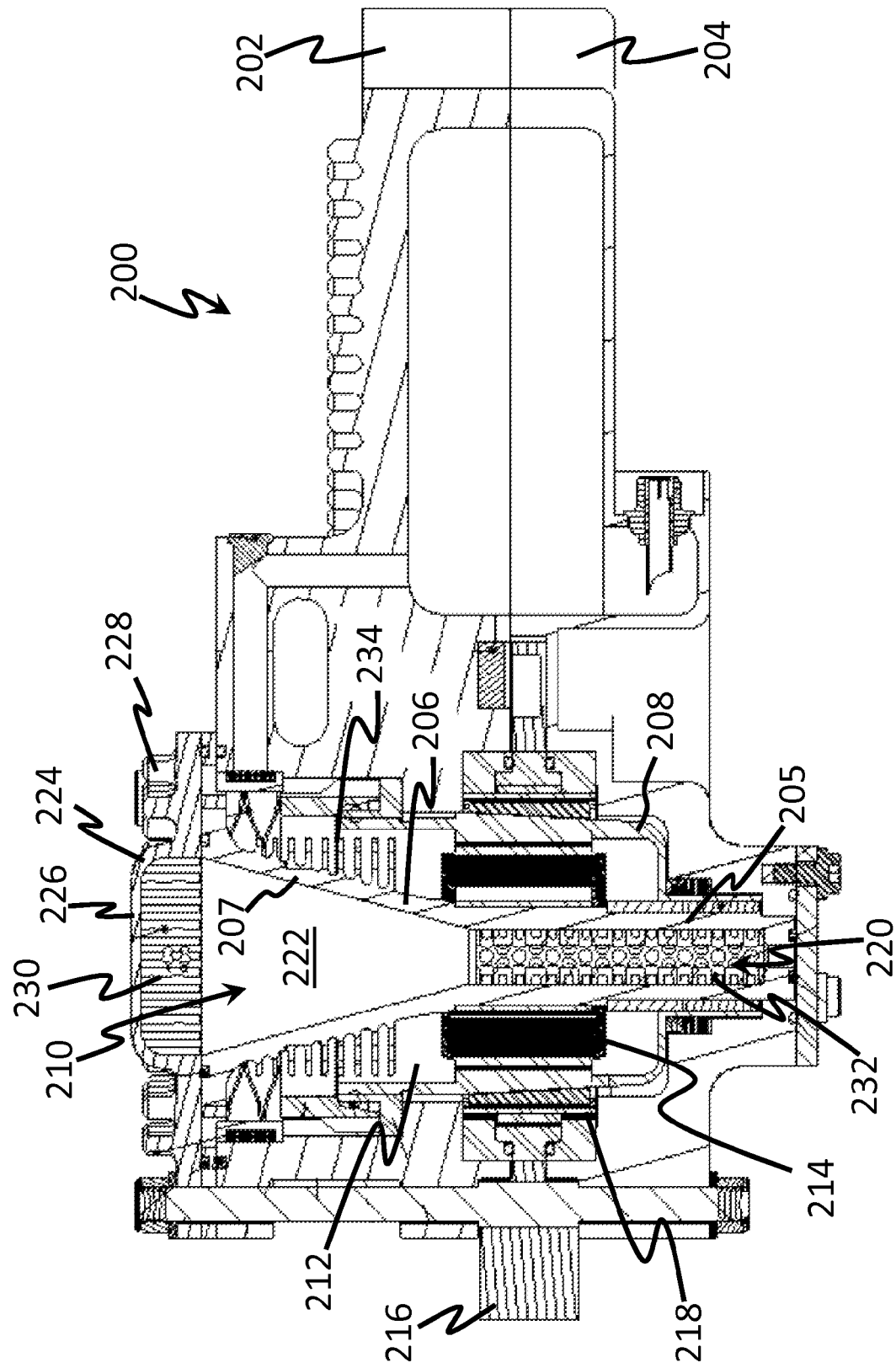
FIG. 2B is a cross-sectional view of the electromagnetic actuator of FIG. 2A, along the line A-A.

Turning now to FIGS. 2A and 2B, an electromechanical actuator motor 200 in accordance with an exemplary embodiment of the invention is shown. FIG. 2A shows a cut-away isometric view of actuator 200 and FIG. 2B shows a cross-sectional view of the actuator 200 along the line A-A in FIG. 2A.

Actuator 200 includes a front housing 202 and a rear housing 204 which are configured to enable actuator 200 to be mounted within and/or to a wing of an aircraft. Within the housing 202, 204 is a servo motor, or more specifically a motor stator 214. The stator 214 is provided to enable the actuator 200 to rotate and/or move an aileron (see FIG. 1). In FIGS. 2A and 2B, the stator 214 provides the motive force to the rotor causing the rotational movement, or actuation, of an output arm 216 that is operatively connected to an aileron (not shown in FIGS. 2A and 2B). Located between the stator 214 and the output arm 216 are one or more bearings 218, such as roller bearings, which further enable the rotational movement and actuation of the output arm 216 and thus the aileron connected thereto.

During operation of the actuator 200, the stator 214 produces heat that must be dissipated or removed in order to prevent overheating and/or damage to the stator 214. In order to prevent overheating of the stator 214, fluids may be contained within the actuator 200 to enable heat dissipation and/or thermal energy transfer away from the stator 214.

Accordingly, within the housing 202, 204 are first and second bodies 206, 208 configured as fluid vessels. In the exemplary embodiment shown in FIGS. 2A and 2B, the second body 208 is configured to act as the rotor with permanent magnets attached thereto. For example, each body/vessel may be defined as a shell or wall with an interior hollow volume or chamber for containing a fluid. The fluids stored or contained within the bodies may be one or more cooling mediums or fluids configured to absorb and remove thermal energy from the stator 214, i.e., enable heat dissipation from the stator 214. As an example, fluids, as used herein, may be air, water, oil, or other similar liquids and/or gases that absorb thermal energy. The first and second bodies 206, 208 may be formed, at least in part, of thermally conductive materials such that thermal energy can between transferred between fluids contained in the fluid vessels. Examples of thermally conductive materials that may be used in various embodiments of the invention are steel, silver, copper, aluminum, and other similar thermally conductive materials and/or composites, and may include magnets attached thereto. However, those skilled in the art will appreciate that other materials may be used without departing from the scope of the invention.

The first body 206 includes a first portion 205 and a second portion 207. The first portion 205 of the first body 206 defines a reduced diameter sleeve that passes through an interior portion or central bore of the stator 214 and includes a first subchamber 220. The second portion 207 defines a larger diameter with a second subchamber 222 located therein, the second subchamber 222 fluidly connected to the first subchamber 220. As shown, the second portion 207 has a conical shape, starting at a reduced diameter, and expanding to a larger diameter as the second portion extends away from the first portion 205. The first and second cavities 220, 222 of the first body 206 are fluidly connected and define a first chamber 210 that is configured to contain a first fluid.

The first fluid is in thermal contact with the stator 214 by means of the first portion 205 (the sleeve within the bore of the stator 214). During operation of the stator 214, the first fluid within the first subchamber 220 will be heated by the heat from stator 214. The thermally conductive material of the first portion 205 of the first body 206 enables thermal transfer from the stator 214 to the first fluid in the first subchamber 220. As the first fluid is heated it will move into the second subchamber 222 by means of convection, thermal expansion, or other process, and then cool down. Once cooled, the first fluid will return to the first subchamber 220, and repeat the process, thus providing a cyclical cooling mechanism within actuator 200.

To further enable the cooling process provided by the first fluid, the first body 206 includes a heat sink 224 at an end thereof, opposite the first portion 205. The heat sink 224 may, in part, define an end cap 226 of the first body 206 and also form part of the front housing 202. Heat sink 224 includes one or more nodes or fins 228 to provide additional surface area on the heat sink 224, improving the efficiency thereof. Thus, when the first fluid contacts the heat sink 224, the thermal energy contained in the first fluid may be transferred to the heat sink 224 and removed from the actuator 200.

Additionally, as shown in FIGS. 2A and 2B, the end cap 226 houses or contains a condenser 230 that is thermally connected to the heat sink 224. Condenser 230 may be any condenser known in the art, and may be one that is relatively small and light such that minimal weight is added to the actuator 200. Condenser 230 enables the first fluid to more efficiently transfer thermal energy away from the stator 214. For example, the first fluid, when located in the first subchamber 220 may be heated to a temperature that causes a phase-change of the fluid, such as from liquid to gas, i.e., the first fluid, in liquid form, is heated to a temperature above its boiling point.

The first fluid, in gas form, will expand and/or flow from the first subchamber 220 into the second subchamber 222. When the first fluid contacts the condenser 230, the gas will again change phase (from gas to liquid). The cooled liquid will then flow back into the first subchamber 220 to repeat the cycle. Moreover, in addition to removing thermal energy (heat) from the stator 214 through the process of fluid convection, the first fluid also consumes a portion of the thermal energy during the phase change from liquid to gas, thus further reducing the heat within actuator 200.

The first portion 205 further includes structural components to increase the efficiency of thermal energy transfer from the stator 214 to the first fluid within the first subchamber 220. For example, as shown in FIGS. 2A and 2B, baffling 232 may be included within the first portion 205 to increase the surface area that the first fluid contacts when in the first subchamber 220. In alternative embodiments, the additional surface area may be provided by metallic sponges, metallic foams, phase change materials, and/or similar structures or materials or combinations thereof.

In some embodiments, the volume of the first fluid may be configured to not fill the entire first chamber 210 when in liquid form. This allows for the phase change of the first fluid, from liquid to gas, without compromising the physical structure of the actuator 200 as a result of the volume expansion during the phase change. Further, in some embodiments, a predetermined amount or volume of the first fluid may be provided in liquid form in the first chamber 210. The predetermined liquid volume may be determined by the volume requirements for gas/liquid transitions and/or determined based on the need to have sufficient fluid to remove heat, even if the phase change does not occur. Thus, in some embodiments, a sufficient volume of liquid of the first fluid is stored within the first chamber 210 such that at least a portion of the first fluid, in liquid form, is present in the first subchamber 220 at all times.

For example, even if a phase change does not occur, the first fluid, in liquid form, may increase in temperature but not boil. The heated liquid will then flow toward the condenser 230 and the heat sink 224 to dissipate the thermal energy contained therein. When applied in the aircraft setting, high transient loads are present during extreme flight conditions, such as take-off and landing, and thus the thermal energy production by the stator 214 may be at its highest leading to boiling of the first fluid. However, during low transient loads, such as when cruising or on the ground, the first liquid may only warm but not reach temperatures at or above the boiling point. However, heat dissipation is still required to prevent overheating of the stator 214. Thus, the predetermined volume or liquid ensures proper cooling for all operating conditions.

Turning now to the second body 208, a second chamber 212 is defined therein and is configured to house a second fluid that is in thermal contact with the stator 214. The second body 208 is larger than the first body 206 and is configured to contain both the stator 214 and at least a portion of the first body 206 within the second chamber 212. The second chamber 212 is fluidly isolated from the first chamber 210 by one or more walls of the first body 206 such that the first and second fluids cannot intermix. Further, as shown, the bearings 218 are fluidly isolated from the second chamber 212 by a wall or portion of the second body 208. However, those skilled in the art will appreciate that it is not required for the bearings 218 to be fluidly isolated from the second chamber 212. In some embodiments, the second chamber 212 may be in fluid communication with the bearings 218. In these embodiments, the second fluid may be a lubricating and/or working fluid for bearings 218, such as oil.

The second fluid located within the second chamber 212 provides another means for heat dissipation. The second fluid surrounds the stator 214 and is in direct contact therewith. Accordingly, thermal energy will be absorbed by the second fluid directly and the second fluid flows toward the heat sink 224 to dissipate heat. As shown in FIGS. 2A and 2B, an exterior surface of the first body 206 may include fins 234 or other similar heat transfer surfaces that extend into the second chamber 212. The fins 234 enable an improved thermal energy transfer from the second fluid, through the first body 206, and into the first fluid. The thermal energy may then dissipate through the heat sink 224 and/or be consumed during phase transitions of the first fluid.

As noted, the exemplary actuator of the embodiments disclosed herein is configured for actuating an aileron of an aircraft. Due to the conditions of high altitude flight the actuator may not be used regularly or consistently when cruising at altitude. However, at cruising altitudes, the ambient temperature may be sufficient to freeze the fluid(s) within the actuator and lack of operative of the actuator may not provide sufficient heat to prevent freezing. Thus, in some embodiments, a heater (not shown) may be included internally or externally to the actuator to heat the fluids contained therein. Those of skill in the art will appreciate that heaters are known and any suitable heater or heating mechanism can be used without departing from the scope of the invention. Alternatively, the stator of the actuator may be dithered to maintain a temperature that is above the freezing point of the fluid(s). Further, in some embodiments, thermocouples and/or other temperature determining/monitoring mechanisms may be used to monitor and/or control the temperature of the fluid(s) within the actuator.

Advantageously, embodiments of the invention provide an efficient means to remove thermal energy produced by a stator of an electromechanical actuator during operation and thus prevent overheating. This is provided, in part, by the inclusion of a fluid chamber that extends through a central bore of the stator and allows for a fluid to absorb thermal energy and transfer it away from the stator. Additionally, thermal energy is removed from the stator through phase change of the fluid that is in the vessel that passes through the central bore of the stator. Furthermore, embodiments of the invention provide additional means of thermal cooling by inclusion of a second fluid that is provided in a second chamber of the actuator that is external to the first chamber, as described above.

Moreover, advantageously, embodiments of the invention enable an actuator with a high power density to be used under high transient loads because the thermal energy may be efficiently and effectively removed from the stator/motor of the actuator. Thus smaller and lighter actuators may be used on thin-wing aircraft. Moreover, advantageously, in accordance with some embodiments, different fluids may be used to cool a stator of an actuator, such that one fluid may be water and the other fluid may be an oil for lubricating bearings of the actuator.

Moreover, advantageously, high power density electric motors benefit from the cooling systems provided herein. The cooling systems provide heat dissipation mechanisms to the motor/stator and the bearings during transient thermal loads. This allows actuators to be sized according to peak characteristics such that a smaller motor could be used to complete the same job as a larger motor that was sized for continuous characteristics.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments.

For example, although described herein as an actuator that is configured to actuate an aileron of an aircraft, the actuators described herein may be used for any actuation on a thin-wing aircraft. Moreover, actuators as described herein are not limited to aircraft, but may be used for any actuation, wherein an electromechanical actuator may be employed.

Moreover, although shown and described with the first and second cavities of first chamber as a single, compact unit in the first body, with the condenser proximate to the first subchamber, this is not a limiting example. For example, the condenser and/or heat sink could be located remote from the actuator and the first fluid may be conveyed to the condenser and/or heat sink through a fluid pipe or connector. This alternative embodiment may further reduce the size and weight of the actuator. Further, although shown with the inclusion of the condenser within the first body, the condenser is an optional feature, and those skilled in the art will appreciate that the thermal systems described herein may omit the condenser without departing from the scope of the invention.

Accordingly, the invention is not to be seen as limited by the foregoing description, but is only limited by the scope of the appended claims.

What is claimed is:

1. A cooling system of an electromechanical actuator comprising:
   a housing having an internal stator and an external rotor;
   an output arm operatively connected to the external rotor;
   the internal stator located within the housing and defining a central bore;
   one or more bearings located between the internal stator and the output arm;
   a first body including a sleeve portion configured to extend into the central bore of the stator, the first body defining a first chamber including a first subchamber within the sleeve portion and a second subchamber fluidly connected to the first subchamber, with water contained within the first chamber and configured to absorb thermal energy produced by operation of the stator; and a heat sink in thermal communication with the second subchamber and forming an end cap of the first body; and a second body disposed within the housing, the second body defining a second chamber that contains the stator and the first body, the second chamber fluidly isolated from the first chamber and defining a space between (i) the second body and (ii) the first body and the stator positioned in said space, with oil contained within the second chamber and configured to absorb thermal energy produced by operation of the stator and provides lubrication to bearings of the electromechanical actuator.

2. The electromechanical actuator of claim 1, wherein the first body includes one or more fins extending into the second chamber and configured to transfer thermal energy from the second chamber to the first chamber.

3. The electromechanical actuator of claim 1, wherein the sleeve portion includes baffling within the first subchamber.

4. The electromechanical actuator of claim 1, further comprising a condenser located proximal to the heat sink and located within the second subchamber.

5. The electromechanical actuator of claim 1, wherein the housing is configured to be installed within a wing of an aircraft and the stator is configured to enable actuation of an aileron of the aircraft.

6. A method of manufacturing a cooling system of an electromechanical actuator comprising:

providing a housing of an actuator, the actuator having internal stator, an external rotor, an output arm operatively connected to the external rotor, and one or more bearings located between the internal stator and the output arm;

installing the internal stator within the housing the internal stator defining a central bore;

installing a first body including a sleeve portion into the housing, wherein the sleeve portion of the body extends into the central bore of the stator and wherein the first body defines a first chamber including a first subchamber within the sleeve portion and a second subchamber fluidly connected to the first subchamber;

installing a second body into the housing, the second body containing the stator and the first body, wherein the second body defines a second chamber fluidly isolated from the first chamber and defining a space between the second body and the first body, the stator positioned within said space;

filling the first chamber with water configured to absorb thermal energy produced by operation of the stator;

providing a heat sink in thermal communication with the second subchamber of the first chamber, the heat sink forming an end cap of the first body to fluidly seal the first chamber; and filling the second chamber with oil configured to absorb thermal energy produced by operation of the stator and provides lubrication to the bearings of the electromechanical actuator.

7. The method of claim 6, further comprising providing a condenser proximal to the heat sink and located within the second subchamber.

* * * * *